United States Patent [19]
Andres

[11] Patent Number: 5,412,778
[45] Date of Patent: May 2, 1995

[54] METHOD OF CLASSIFICATION AND PERFORMANCE EVALUATION OF COMPUTER ARCHITECTURES

[75] Inventor: Frédéric Andres, Paris, France

[73] Assignee: Bull, S.A., Paris, France

[21] Appl. No.: 107,663

[22] PCT Filed: Dec. 17, 1992

[86] PCT No.: PCT/FR92/01203

§ 371 Date: Aug. 18, 1993

§ 102(e) Date: Aug. 18, 1993

[87] PCT Pub. No.: WO93/12505

PCT Pub. Date: Jun. 24, 1993

[30] Foreign Application Priority Data

Dec. 19, 1991 [FR] France ................ 91 15812

[51] Int. Cl.$^6$ ........................................... G06F 13/00
[52] U.S. Cl. ............................ 395/200; 395/800
[58] Field of Search ............... 395/375, 800, 500, 200

[56] References Cited

PUBLICATIONS

"Taxonomy for Computer Architecture", Skillicorn IEEE, vol. 26, iss. 11, Nov. 1988, pp. 46–57.
"A Conceptual Framework for the Description and Classification of Computer Architecture", Kavi, IEEE, 1983, pp. 10–19.
"A Taxonomy of Parallel Computer Architectures", Gurd IEEE, pp. 57–61, 1988.
"A Hierarchial Taxonomic System for Computer Architectures" Dasgupta, Computer Journal, vol. 23, Iss 3, pp. 64–74, Mar. 1990.
Kai Hwang, Briggs, F. A. "Computer Architecture & Parallel Processing", 1984 N.Y., USA, pp. 460, 468–470, FIGS. 7, 8.
Proceedings of the 1977 Int'l Conference on Parallel Processing 1977, D.C., pp. 7–15, Handler "The Impact of Classification Schemes on Computer Architecture".
Proceedings of the Int'l Workshop on Artificial Intelligence for Industrial Applications, vol. 1, May 27, 1988, Japan, pp. 232–236, Scherf, "Knowledge-Based Performance Evaluation of Computer Architectures".

*Primary Examiner*—Robert B. Harrell
*Assistant Examiner*—Viet Vu
*Attorney, Agent, or Firm*—Kerkam, Stowell, Kondracki & Clarke; Edward J. Kondracki

[57] ABSTRACT

The present invention provides a method for classifying an architecture of a computer, the computer having a plurality of processors that are interconnected to one or more memories via interconnect networks. The method classifies the architecture of the computer by evaluating the number of local communications between a memory and a processor and evaluating the number of shared communications between a processor and a plurality of memories. A range coefficient is then determined based on a ratio of the number of local communications and shared communications. The range coefficient is used to classify the architecture and to evaluate the performance thereof.

13 Claims, 5 Drawing Sheets

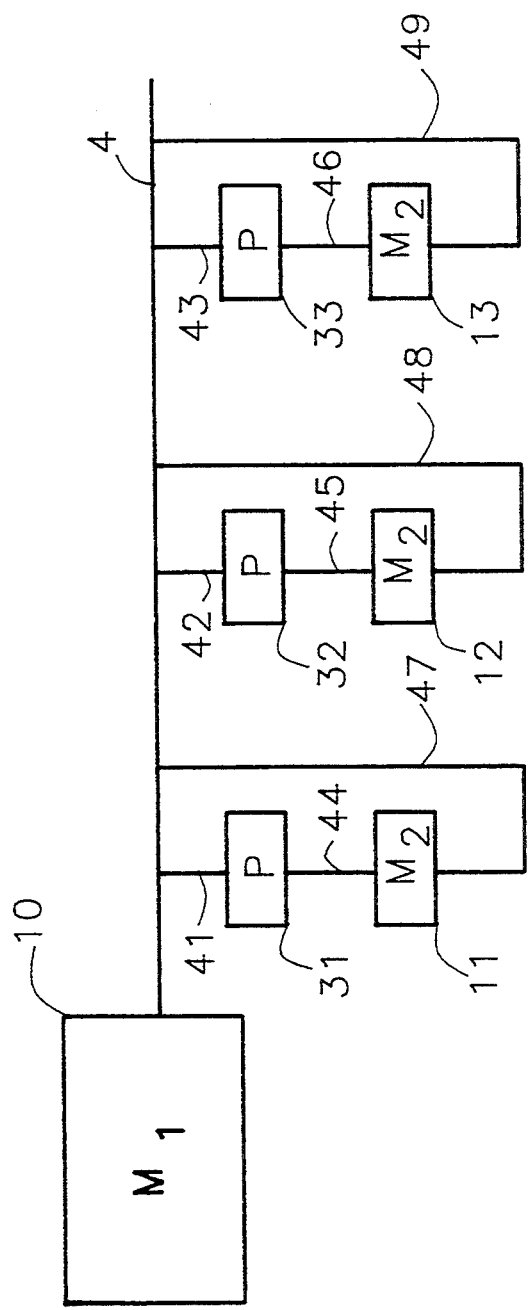
FIG:4

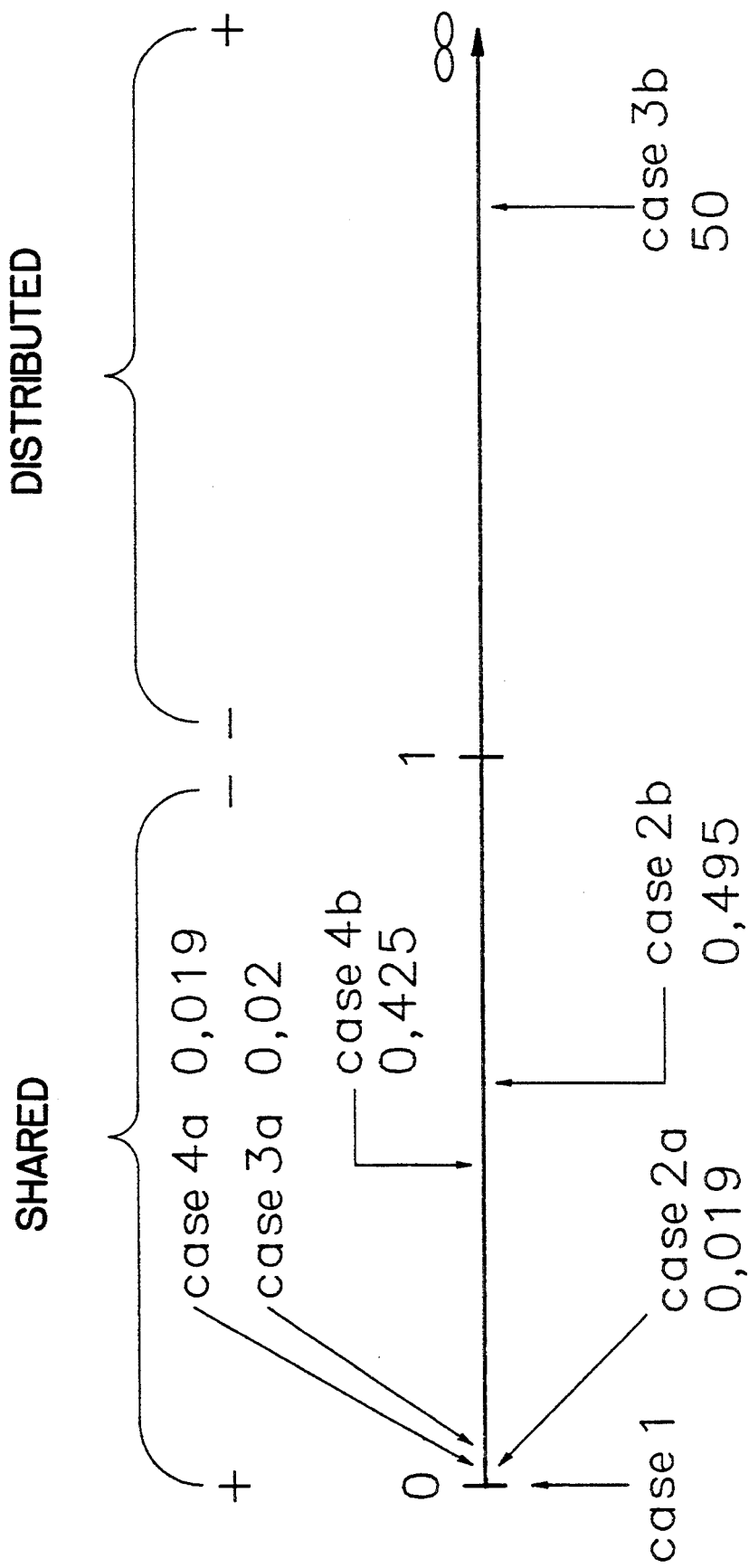
Fig:5

METHOD OF CLASSIFICATION AND PERFORMANCE EVALUATION OF COMPUTER ARCHITECTURES

FIELD OF THE INVENTION

The present invention relates to a method for classification of computer architectures, for example for use in the architecture definition library used in running a performance evaluator program.

BACKGROUND OF THE INVENTION

When a performance evaluator program is used, either to determine the costs of a given request or to evaluate the optimum system for the intended type of use (examples: fixed application, fixed DBMS, fixed operating system), it is necessary to parametrize a library containing the characteristics of the architecture of the system for which evaluation is to be done. In thus defining the architecture, the user is presented with a problem in determining whether the architecture is classified as a distributed model or a shared memory model. This classification has repercussions on the evaluation method used.

SUMMARY OF THE INVENTION

A first object of the invention is accordingly to propose a method that makes it possible to make an automated classification of the architecture from the description of the system, with a view to using the classification in an architecture library of an evaluator.

This first object is attained in that the method of classification of the architectures of a computer with a view to performance evaluation, the computer comprising a plurality of processors put into relation with one or more memories via interconnect networks (example: bus), comprises, on the one hand, evaluating the number of local communications between a memory and a processor and on the other, evaluating the number of shared communications between a processor and a plurality of memories; and determining a range coefficient by calculating the ratio between the number of local communications and the number of shared communications.

In another feature, the method includes a step of determining the equivalency of the architectures of the same range, comprising determining a weighted range coefficient by calculating the ratio between the sum of memory sizes of the local communications and the sum of memory sizes of the shared communications;

comparing the weighted range coefficients; and considering architectures having the same weighted range coefficient to be equivalents.

In another feature, the method further comprises comparing the value of the range coefficient or weighted range coefficient with respect to the value 1.

In another feature, the method comprises considering the architecture to be distributed if the range coefficient is greater than 1, and shared if the range coefficient is less than 1.

Another object is to propose a use of a method in a performance evaluator program.

In another feature, the method comprises memorizing this information in the memory of the system running the evaluator program at the address of the library for describing the architecture of the system for which the classification is made.

In another feature, the method comprises memorizing, in the memory of the system, the links with the architectures of the same type (distributed and shared) that are considered to be equivalents.

In another feature, the description of the system whose architecture is to be classified is entered in the form of a diagram displayed on the screen of the system on which the program is run, the memories for description of the system to be classified being represented by objects inside which the values of the memory sizes corresponding to the diagram are written, and means automatically determining the types of communication associated with the memories in order to calculate the range and weighted range coefficients.

In another feature, the description of the system is entered at the keyboard of the information processing system serving the purpose of the execution, by using a specific description language (ESL, for environment specification language).

Further features and advantages of the present invention will become more apparent from reading the ensuing description taken in conjunction with the accompanying drawings, in which:

BRIEF DESCRIPTION OF THE DRAWINGS

The invention will be described with reference to the following drawings in which like reference numerals refer to like elements, and wherein:

FIG. 4 is a diagram representing a fourth example of an architecture for which classification is sought;

FIG. 5 schematically shows the classification of the various architectures of FIGS. 1-4 by the shared and distributed mode, and the equivalent architectures in a given mode.

DETAILED DESCRIPTION OF PREFERRED EMBODIMENTS

Figure 1:
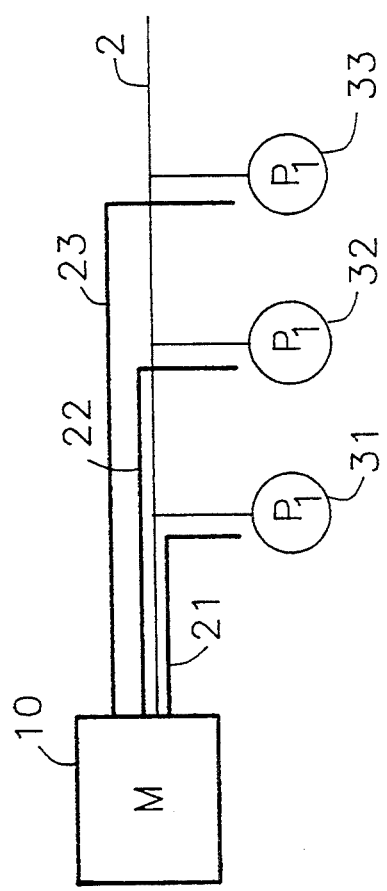
FIG. 1 is a diagram representing one example of architecture for which classification is sought.

FIG. 1 shows a first example of architecture of an information processing system, in which a memory (10) of size M is connected by a bus (2) to three processors (31, 32, 33) that share this memory. This kind of architecture is known as completely or substantially completely shared. In a very simple case, it may not be necessary to have a method and a process of architecture classification, but in the more complex cases shown in the following figures, the method proves quite useful.

To analyze the architecture of the type shown in FIG. 1, one determines the local communications, which represent the communications between a memory and a processor, and the shared communications, in which one memory communicates with a plurality of processors. In the case of FIG. 1, there are three shared communications COPA (21, 22, 23) between the respective processors (31, 32, 33) and the memory (10).

The architecture of FIG. 1 includes no local communication whatever. The classification method comprises determining a range coefficient, which is the ratio between the sum of local communications and the sum of shared communications. This range coefficient CP is 0, in the case of FIG. 1. To determine whether the memory and the architecture are of the distributed or shared type, this range coefficient is then compared with the value (1). If the range coefficient is less than 1, the architecture is called shared; if the range coefficient is greater than 1, the architecture is called distributed. The method also comprises, in a later step, calculating a weighted range coefficient constituted by the sum of the sizes of the memories that are in local communication, and dividing this value by the sum of the sizes of the memories that are in shared communication. This weighted range coefficient CPP thus obtained makes it possible, for the various architectures falling in the same type of classification, to determine whether these architectures are equivalent. The utility of the range coefficients and the weighted range coefficients will be better understood in the light of the examples of the following drawings.

In the case of FIG. 1, the weighted range coefficient is also 0.

Figure 2:
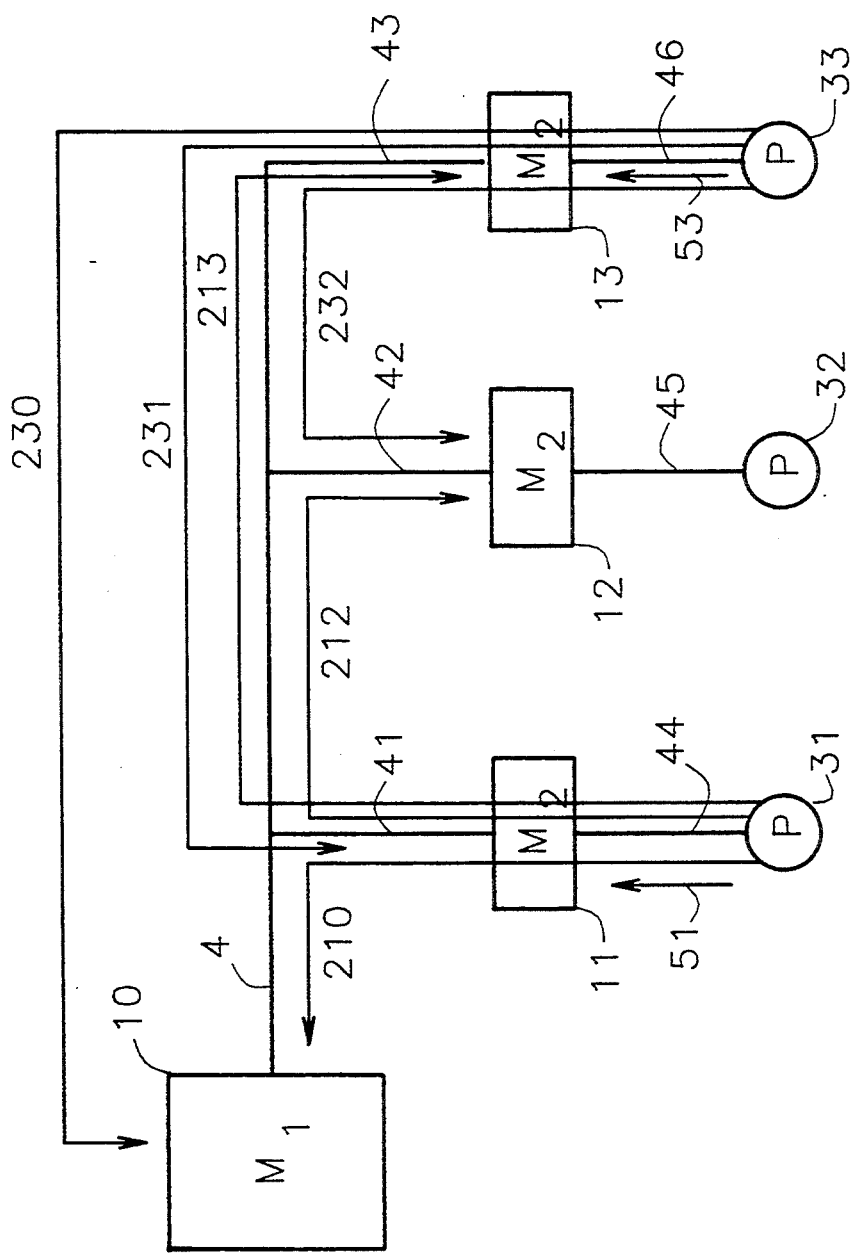
FIG. 2 is a diagram representing a second example of an architecture for which classification is sought.

The second architecture example, shown in FIG. 2, is constituted by a memory (10) of size M1, communicating by a bus (4) with a set of three memories of size M2, (11, 12, 13), respectively, connected to the bus 4 by the respective connections (41, 42, 43). These memories (11, 12, 13) of size M2 are in turn connected to three processors (31, 32, 33), respectively, by respective connections (44, 45, 46). Hence in this architecture, the processor (31) is connected on the one hand to the memory (11) via a local communication (51), and on the other to the other memories of the same size by the shared communications (212, 213), and to the memory (10) of size M1 by the shared communication (210). Hence a processor (31) is connected on the one hand by a local communication to a memory of size M2, on the other by two shared communications to two memories of size M2, and by a third shared communication to a memory of size M1.

Consequently, the range coefficient equals 3:9, that is, three local communications for the three processors (31, 32, 33), and nine shared communications for the three processors.

The range coefficient: $3/9 = \frac{1}{3} = CP$.
The weighted range coefficient is equal to:

$$CPP = \frac{3M2}{3M_1 + 6M2}$$

If the size M1 is 50 MB and the size M2 is 1 MB, then $$CPP = \frac{3}{50 \cdot 3 + 6} = \frac{3}{156} = 0.019$$

This constitutes case 2a.

If the memory sizes are 1 MB for M1 and 50 MB for M2, then the weighted range coefficient becomes:

$$CPP = \frac{50 \cdot 3}{6 \cdot 50 + 3} = \frac{150}{303} = 0.495$$

This constitutes the weighted range coefficient of case 2b.

Figure 3:
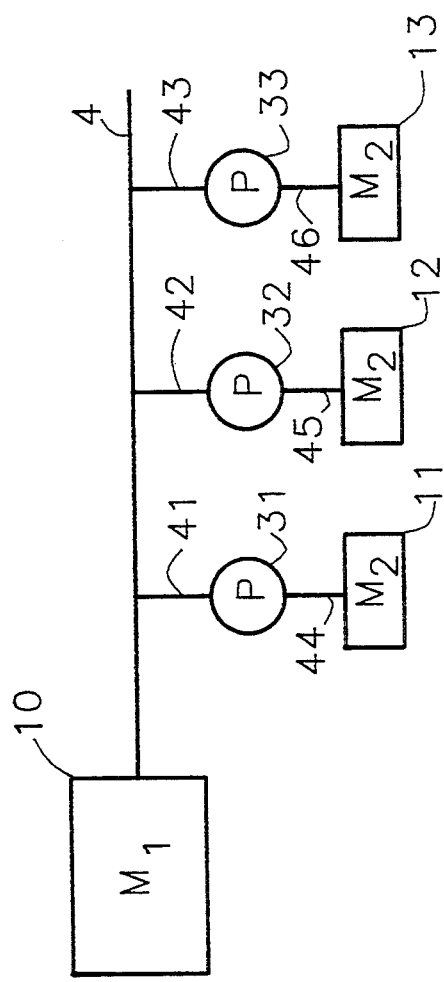
FIG. 3 is a diagram representing a third example of an architecture for which classification is sought.

The architecture shown in FIG. 3 is constituted by a memory (10) of size M1 connected by a bus (4) and its extensions (41, 42, 43) respectively to three processors (31, 32, 33). Each of the processors is connected by a respective connection (44, 45, 46) to a respective memory (11, 12, 13) of size M2. For this type of architecture, a given processor (31 or 32 or 33, respectively) to has only one local communication (31, 11; 32, 12; 33, 13, respectively). Each processor (31, 32, 33, respectively) also has a single shared communication (31, 10; 32, 10; 33, 10, respectively). In fact, the processor (32) cannot communicate with the memory (11) without passing through the processor (31). Hence the architecture has three local communications and three shared communications, and the range coefficient equals 1. The weighted range coefficient CPP will be equal to the ratio of M2:M1. If the size M2 is less than the size M1, then the weighted range coefficient will be less than 1, and the architecture will instead be a shared memory type. Hence for case 3a where M2=1 MB and M1=50 MB, the coefficient CPP of case 3a will equal 0.02.

If the size M2 is greater than the size M1, then the weighted range coefficient will be greater than 1, and the architecture will instead be of the distributed memory type.

In the case 3b, where M2=50 MB and M1=1 MB, the coefficient CPP of case 3b will be equal to 50.

FIG. 4 shows a final example of architecture, in which a memory 10 of size M1 is connected by a bus 4 and the connections (41, 42, 43) to three respective processors (31, 32, 33). Each of these processors is connected by a respective connection (44, 45, 46) to a memory (11; 12; 13, respectively) of size M2. Each memory of size M2 is in turn connected to the bus 4 by a respective connection (47, 48, 49).

Such an architecture accordingly makes it possible for a processor (31) to have one local connection with the respective memory (11) of type M2 with which it is associated, and three shared connections, one of them with the memory (10) of type M1 and two with the memories (12 and 13, respectively) associated with the other processors (32, 33) of type M2. The architecture set accordingly makes three local connections M2, three shared connections M1, and six shared connections M2. CP is equal to $\frac{1}{3}$.

$$\text{The coefficient } CPP = \frac{3M2}{3M1 + 6M2}$$

In the case 4A where the memory M1 is 50 MB in size and the memories M2 are 1 MB in size, the weighted range coefficient will be as follows:

$$CPP = \frac{3}{50 \cdot 3 + 6} = \frac{3}{156} = 0.019$$

In the case 4B, where M2=50 MB and M1=1 MB, the weighted range coefficient CPP will be:

$$CPP = \frac{150}{3 + 6 \cdot 50} = \frac{150}{303} = 0.495$$

By placing the various values obtained for each of the cases studied on the graduated axis in FIG. 5, between the values of 0 and infinity, and using the value 1 as the boundary value, it can be confirmed that cases 1, 2, 4 and 3a are of the shared type instead, and the case 3b is of the distributed type, and that cases 2a and 4a are equivalent, since the CPPs are equal, and case 3a is practically equivalent to the preceding two cases. This method thus makes it possible to set up a classification of architecture as to shared or distributed type and to memorize the result of this classification in the architecture library of the memory of the system that will use this result for later making a performance evaluation of the architecture described.

The architecture described may be entered in graphical form with objects associated with the memories to be represented as rectangles and inside which the values of the memory sizes are written. Lines represent the connections between the memories and the processors, which in turn are represented by other objects, such as circles.

Software then examines the various communications and the class as to local or shared type, and then determines the coefficients by calculation.

Another possibility comprises entering the number of local communications and communications of the shared type, as well as sizes of the memories used in the computation of the range and weighted range coefficients directly from the keyboard.

The software consequently by itself calculates the coefficients CP and CPP, and arranges the results in memory after having made the comparison with the value 1 to determine whether the architecture is of the shared or distributed type, and classifies the architectures of the same type that are considered to be equivalent in the same zone by comparison of the CPPs in a given type of architecture.

While the invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention described herein and defined in the following claims.

I claim:

1. A computer implemented method of classification of an architecture of a computer of the shared or distributed memory type, said computer comprising a plurality of processors in operative relation with one or more memories via interconnect networks, said classification being done with a view to performance evaluation of the architecture by a performance evaluator executed by a system, the method comprising the steps of:
   storing a description of the computer in a memory of the computer;
   determining a number of local communications between a memory and a processor and storing said number of local communications as a first number;
   determining a number of shared communications between a memory and a processor and storing said number of shared communications as a second number; and
   determining a range coefficient by calculating a ratio between said first number and said second number.

2. The method of claim 1, further comprising a step of determining an equivalency of architectures of a same range, said step comprising:
   for said plurality of processors, adding the size of memories involved in local communications with each one of said plurality of processors to form a first global sum;
   for each of said plurality of processors, adding the size of memories involved in shared communications with said processor to form a plurality of second sums;
   computing a second global sum by adding together said plurality of second sums;
   determining a weighted range coefficient by calculating a ratio of said first global sum and said second global sum;
   comparing the weighted range coefficients; and
   considering architectures having the same weighted range coefficient to be equivalent.

3. The method of claim 1, further comprising: comparing the value of the range coefficient with respect to the value 1.

4. The method of claim 2, further comprising: comparing the value of the range coefficient or weighted range coefficient with respect to the value 1.

5. The method of claim 3, further comprising: considering the architecture type to be distributed if the range coefficient is greater than 1, and shared if the range coefficient is less than 1.

6. The method of claim 4, further comprising: considering the architecture type to be distributed if the range coefficient is greater than 1, and shared if the range coefficient is less than 1.

7. The method of claim 5, further comprising: memorizing the architecture type in a memory of the system running the performance evaluator at an address of a library of description of the architecture of the computer for which the classification is made, wherein said performance evaluator calls on the library of description of architectures to determine the address.

8. The method of claim 6, further comprising: memorizing the architecture type in a memory of the system running the performance evaluator at an address of a library of description of the architecture of the computer for which the classification is made, wherein said performance evaluator calls on the library of description of architectures to determine the address.

9. The method of claim 1, further comprising: memorizing, in the memory of the system running the performance evaluator, links between architectures of the same type (distributed or shared) that are considered to be equivalent.

10. The method of claim 1, further comprising the step of: entering a description of the system whose architecture is to be classified as a diagram displayed on the screen of the system running the performance evaluator, the one or more memories of said computer being represented by objects inside which corresponding memory size values are written, and further comprising the step of automatically determining the types of communication associated with said memories in order to calculate said range and weighted range coefficients.

11. The method of claim 9, further comprising the step of: entering a description of the system whose architecture is to be classified as a diagram displayed on the screen of the system running the performance evaluator, the one or more memories of said computer being represented by objects inside which corresponding memory size values are written, and further comprising the step of automatically determining the types of communication associated with said memories in order to calculate said range and weighted range coefficients.

12. The method of claim 10, further comprising the step of entering a description of said computer whose architecture is to be classified at a keyboard of a system running the performance evaluator by using a specific description language.

13. The method of claim 11, further comprising the step of entering a description of said computer whose architecture is to be classified at a keyboard of a system running the performance evaluator by using a specific description language.

* * * * *